(12) United States Patent
Contu et al.

(10) Patent No.: US 10,753,044 B2
(45) Date of Patent: Aug. 25, 2020

(54) PROCESS FOR PRODUCING A FLAKED THERMAL-INSULATING AND/OR ACOUSTIC-INSULATING MATERIAL

(71) Applicants: Davide Contu, Nole (IT); Claudio Cerutti, Volpiano (IT)

(72) Inventors: Davide Contu, Nole (IT); Claudio Cerutti, Volpiano (IT)

(73) Assignee: ENERPAPER S.R.L., Turin (IT)

(*) Notice: Subject to any disclaimer, the term of this patent is extended or adjusted under 35 U.S.C. 154(b) by 121 days.

(21) Appl. No.: 16/095,132

(22) PCT Filed: Apr. 22, 2016

(86) PCT No.: PCT/IB2016/052287
§ 371 (c)(1),
(2) Date: Oct. 19, 2018

(87) PCT Pub. No.: WO2017/182846
PCT Pub. Date: Oct. 26, 2017

(65) Prior Publication Data
US 2019/0145051 A1 May 16, 2019

(51) Int. Cl.
| | | |
|---|---|---|
| *D21H 21/34* | (2006.01) | |
| *D21H 15/08* | (2006.01) | |
| *D21H 23/56* | (2006.01) | |
| *D21B 1/06* | (2006.01) | |
| *D21H 21/36* | (2006.01) | |
| *D21F 9/00* | (2006.01) | |
| *F16L 59/02* | (2006.01) | |

(52) U.S. Cl.
CPC ............. *D21H 15/08* (2013.01); *D21B 1/068* (2013.01); *D21F 9/00* (2013.01); *D21H 21/34* (2013.01); *D21H 21/36* (2013.01); *D21H 23/56* (2013.01); *F16L 59/028* (2013.01)

(58) Field of Classification Search
USPC ........................................................ 162/136
See application file for complete search history.

(56) References Cited

U.S. PATENT DOCUMENTS

| 5,631,047 A | 5/1997 | Friloux |
|---|---|---|
| 6,837,452 B2 | 4/2005 | Dezutter et al. |
| 2004/0041040 A1 | 3/2004 | Dezutter et al. |

FOREIGN PATENT DOCUMENTS

| DE | 102011084012 A1 | 4/2012 |
|---|---|---|
| EP | 2706143 A2 | 3/2014 |
| RU | 2575461 C2 | 2/2016 |
| WO | 2010067338 A2 | 6/2010 |
| WO | 2011107476 A2 | 9/2011 |

OTHER PUBLICATIONS

International Search Report and Written Opinion of the International Searching Authority for PCT/IB2016/052287 dated Dec. 22, 2016.
Russian Search Report for PCT/IB2016/052287 filed Apr. 22, 2016 dated Aug. 28, 2019.

*Primary Examiner* — Mark Halpern
(74) *Attorney, Agent, or Firm* — Heslin Rothenberg Farley & Mesiti P.C.; Victor A. Cardona, Esq.

(57) ABSTRACT

A process for producing a flaked cellulose-based thermal- and/or acoustic-insulating material includes preparing a cellulose-based pulp and providing a web of paper having a given thickness, starting from the pulp. A coating having a mixture containing a first substance having a flame-retardant function and a second substance having an anti-mould function is applied on the web. The coated web is subjected to a milling operation so as to provide flakes of flaked insulating material.

9 Claims, 2 Drawing Sheets

US 10,753,044 B2

PROCESS FOR PRODUCING A FLAKED THERMAL-INSULATING AND/OR ACOUSTIC-INSULATING MATERIAL

CROSS REFERENCE TO RELATED APPLICATIONS

This application is a national stage filing under section 371 of International Application No. PCT/IB2016/052287, filed on Apr. 22, 2016, published in English on Oct. 26, 2017 as WO2017/182846A1, the entire disclosure of this application is hereby incorporated herein by reference.

TECHNICAL BACKGROUND OF THE INVENTION

The present invention relates to a process for producing a flaked cellulose-based thermal- and/or acoustic-insulating material.

The majority of the known processes for producing insulating flakes of the type in question envisage the use, as starting material, of waste paper or cardboard, and usually envisage a series of steps in which said material is first treated mechanically for shredding it and reducing it into flakes, and is then treated via a series of additives for sanitization of the material, for example bioinhibitors (boric acid, borax, etc.).

The insulating materials obtained from the above processes present the drawback of containing various undesirable substances, deriving from the original material (for example, magazines, newspapers, etc.), such as calcium carbonate, inks, glazings, etc., which involve problems both in relation to conservation of the material and in relation to its insulating performance.

Likewise known in the art is a type of process for producing cellulose-based flaked insulating material, which envisages the use of paper-mill sludge as starting material. This process is, for example, described in the document No. WO2010/067338. The industrial process described in the above document envisages, in its essential steps, mixing of paper-mill sludge with waste paper and possibly with first-extraction cellulose obtained directly from wood, milling of the material thus mixed until the desired size is obtained, treatment of the material in a pulper for separating and isolating the individual cellulose fibres, a further mechanical treatment in a mill, and finally a step of drying of the material. This process envisages introduction of a series of additives into the pulper, for example fungicides, flame-retardants, colouring agents, etc.

OBJECT AND SUMMARY OF THE INVENTION

In this context, the present applicants have provided a new type of process for producing cellulose-based flaked insulating material which affords a series of advantages both in relation to implementation of the process and in relation to the quality of the product obtained.

This process is characterized in presenting the steps recalled in Claim 1.

The characteristics referred to in the claims form an integral part of the technical teaching provided herein.

BRIEF DESCRIPTION OF THE DRAWINGS AND DETAILED DESCRIPTION OF ONE OR MORE EMBODIMENTS OF THE INVENTION

Further characteristics and advantages of the present invention will emerge clearly from the ensuing description with reference to the annexed drawings, which are provided purely by way of non-limiting example and in which.

Figure 1:
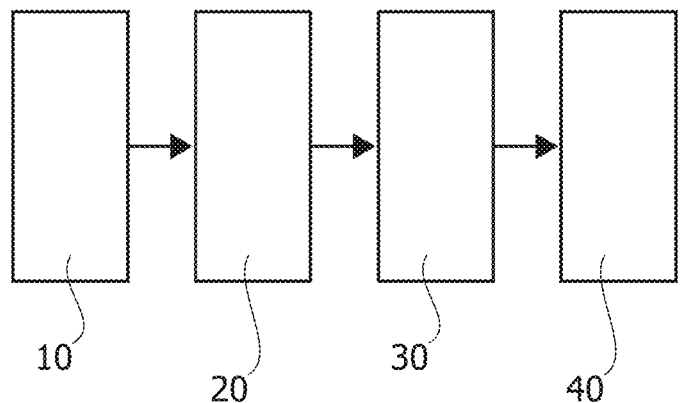
FIG. 1 is a schematic illustration of an embodiment of the process described herein.

In the ensuing description, various specific details are illustrated, aimed at providing an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are only for convenience and hence do not define the sphere of protection or the scope of the embodiments.

As has been seen above, the process described herein has the purpose of producing cellulose-based flaked insulating material.

This process is characterized in that it envisages the following steps:

preparing a cellulose-based pulp;

providing a web of paper having a given thickness and grammage, starting from said pulp;

applying on said web a coating constituted by a mixture containing a first substance having a flame-retardant function and a second substance having an anti-mould function; and subjecting said coated web to a milling operation so as to provide flakes constituting said flaked insulating material.

The process in question hence envisages producing a web of paper proper and of subjecting this web to a specific surface treatment in order to bestow given properties on the insulating material.

Only after the web has assumed a definitive configuration from the standpoint of its composition and structure, is it processed mechanically for producing the flakes constituting the end product.

In view of the foregoing, the totally innovative approach of this process as compared to the known processes discussed at the start is consequently evident. In fact, as has been seen, the above processes all envisage providing simple aqueous mixtures or mixtures of dry material and introducing possible additives into these mixtures. Next, these mixtures are directly processed mechanically and possibly subjected to one or more drying steps to obtain the flakes of the desired size.

In these known processes, there are necessarily intrinsic limits in the level of control that can be exerted on the structure and consistency of the individual flakes and on the amount of additives applied thereon, precisely on account of the methods employed both in the formation the flakes and in the introduction of the various additives.

The above drawbacks are, instead, altogether overcome by the process described herein.

In fact, as will be seen in detail hereinafter, the fact of obtaining the flakes passing through an intermediate product constituted by a proper web of paper and of introducing the various additives, subjecting the web to a surface treatment, enables precise and repeatable control of the thickness and density of the final flakes, and, moreover, precise and repeatable control of the amount of additives applied thereon.

The process described herein may be implemented directly on a conventional paper-production line, which, as will be seen in what follows, is appropriately prearranged for being able to reproduce the process in question.

The process raw materials may be virgin raw materials, in particular wood, or else secondary materials, for example waste paper, paper-mill sludge, or a combination of these.

Starting from these raw materials, the process envisages producing a pulp for the production of the web of paper, which in general may present the same characteristics as those of a normal pulp for paper manufacture (step 10 of the block diagram of FIG. 1).

In the preferred embodiment in which the process is carried out on a conventional paper-production line, the above pulp is accumulated within the headbox of the line, which feeds the pulp onto a fabric-mesh conveyor belt (known as "wire"), on which the pulp is evenly distributed and starts its path along the line up to formation of the sheet.

In particular, in a way in itself conventional, the pulp is gradually deprived of its water content by passing through a succession of batteries of rolls, specifically—to mention the main assemblies of the line—draining rolls, pressing rolls, and drying rolls.

At output from the latter the web of paper is already formed, which has a degree of humidity of approximately 5%. The production of the web of paper is represented in FIG. 1 by step 20.

The grammage and thickness of the sheet can be appropriately regulated according to the specific applications for which the insulating material is designed. Preferred values of grammage are between 5 and 200 $g/m^2$. The thickness of the sheet is preferably between 0.1 and 0.5 mm.

The above regulation of density and thickness is obtained by adjusting the corresponding parameters on which it is possible to act in the framework of a conventional paper-manufacturing process. In particular, the density is controlled at the headbox by regulating distribution of the pulp over the wire. The thickness of the sheet is instead controlled at the aforementioned pressing rolls, by adjusting the nip between these rolls.

The surface treatment of the sheet mentioned above is carried out downstream of the drying rolls when the sheet has by now a stable and defined structure (step 30 of FIG. 1).

As has been said, this treatment envisages coating the sheet, preferably on both sides, with a series of substances designed to bestow given properties according to the destination of use of the material as insulating material. In particular, this treatment envisages using as coating material a mixture containing at least one substance having a flame-retardant function and at least one further substance having an anti-mould function. Preferably, the mixture moreover also contains a third substance having an anti-dusting function.

In this connection, it should be noted that the anti-dusting function consists in binding more tightly together the cellulose fibrils and various fillers contained in the web of paper in such a way that the dispersion in air thereof viewed as aerosol of fine particulate is reduced. This function prevents formation of dust during flaking and during blow injection of the insulating material, on the one hand improving safety of the working environment—thanks to the smaller amount of dust in suspension—and, on the other hand, rendering the average size of the cellulose flake more uniform and constant over time.

Substances having a flame-retardant function that can be used may be ammonium phosphate salts, urea, or aluminium salts.

Substances having an anti-mould function may be copper salts, such as copper sulphate, copper oxychloride, and Bordeaux mixture.

Preferably, the mixture comprises starch-based organic polymers, carboxymethylcellulose, cold-soluble polyvinyl alcohols, as well as monomers of monosaccharides or disaccharides (glucose, mannose, sucrose, etc.); these elements are used as ligands having an anti-dusting function.

In various preferred embodiments, as in the one illustrated, the above treatment is performed in a so-called size-press station or else in a film-press station, these stations normally being used for providing glazings on paper.

Figure 2:
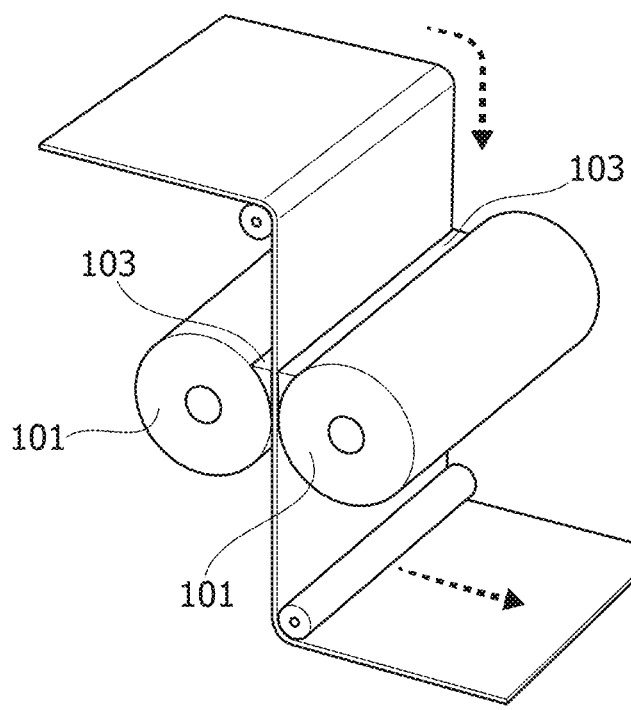
FIG. 2 represents an example of implementation of a specific step of the process described herein.

With reference to FIG. 2, which is a schematic illustration of a size-press station, this station usually comprises two squeezing rolls 101 through which the sheet passes, and, above the nip between the rolls, a sort of sump or reservoir 103 containing the mixture for coating of the paper. The sheet is completely immersed in the mixture before it reaches the two rolls, and in this way the paper is completely impregnated with the mixture. The amount of mixture that remains applied on the sheet depends upon the pressure between the two rolls. Usually, downstream of the two rolls, the sheet passes through an infrared drying oven.

A film-press station differs from the size-press station just described simply in that the mixture is not applied directly on the sheet but on one of the two squeezing rolls, which then transfers it onto the sheet.

The treatment in question enables complete coating of the surface of the web of paper and, moreover, precise control of the density and thickness of the coating. Also in this case, the parameters used for carrying out this type of regulation may be the same as those used for regulating the density and thickness of the coating provided in a conventional glazing process.

Preferably, the density of the coating provided has values of between 5 and 20 $g/m^2$.

The web of paper thus formed may undergo a milling operation, to be reduced into flakes directly on line, so that a milling station designed to carry out this operation may be provided downstream of the line for production of the web.

Alternatively, after the web has possibly being cut to size along the opposite longitudinal edges, it may be wound in a reel and then stored in this form. This option evidently enables a considerable saving of space in the store and moreover facilitates transport of the material. Possibly, instead of being wound in a reel, the web can be divided into individual sheets that are stored in packs.

In view of the advantages indicated above, it may likewise be envisaged to transform the web of paper into flakes, only at the moment of laying of the insulating material so that the web undergoes milling directly on the installation site. Alternatively, milling and production of the flakes can be carried out in the plant, and the flakes produced are in this case packaged in bags for transportation. Preferably, the milling operation is performed with a hammer mill.

In FIG. 1, the milling process is in any case as a whole represented by step 40.

Figure 3:
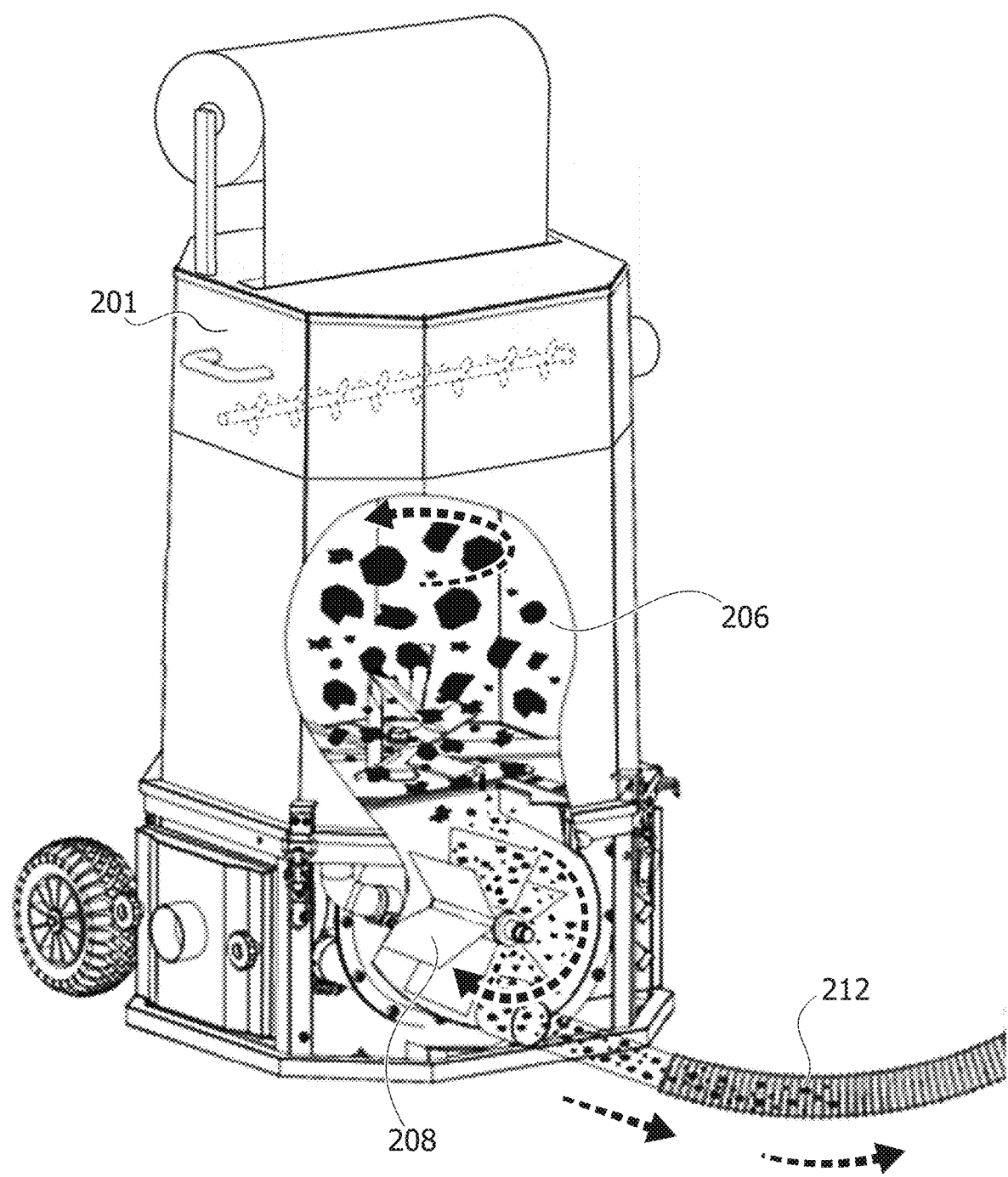
FIG. 3 illustrates an example of machine for carrying out the milling operation envisaged in the process described herein.

As regards the case where milling of the web is carried out in situ, FIG. 3 represents an example of transportable machine designed for carrying out this operation. As is shown, this machine is preferably mounted on wheels.

The machine is prearranged for housing the reel directly and is likewise able, according to a continuous process, to blow the flakes formed into the installation site.

In particular, as may be seen in FIG. 3, in various embodiments, as in the one illustrated, this machine comprises a chamber 201 containing one or more milling tools (micromills), in which the sheet rolled off the reel is shredded until the desired size is obtained. This chamber is in communication with a second chamber 206, within which the flakes formed are gathered. The machine moreover comprises a fan 208 for aspirating the flakes formed and feeding them, through a pipe 212, directly into the installation site. Provided between the first and second chambers is a separation membrane having openings (for example, a mesh—not illustrated), these openings having pre-determined dimensions to enable only passage of flakes having a size smaller than a given threshold value.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. A process for producing a flaked cellulose-based thermal- and/or acoustic-insulating material, comprising:
    preparing a cellulose-based pulp;
    providing a web of paper having a given grammage and a given thickness, starting from said pulp;
    applying on said web a coating comprising a mixture containing a first substance having a flame-retardant function and a second substance having an anti-mould function; and
    subjecting said coated web to a milling operation so as to provide flakes of said flaked insulating material.

2. The process according to claim 1, wherein the applying the coating is performed in a size-press or film-press station prearranged for applying on said web a mixture containing said first and second substances.

3. The process according to claim 1, wherein said mixture comprises a third substance having an anti-dusting function.

4. The process according to claim 1, further comprising applying said coating on said web, with a density between 5 and 30 g/m².

5. The process according to claim 1, wherein said web has a thickness between 0.1 and 0.5 mm.

6. The process according to claim 1, further comprising providing said web with a grammage between 50 and 200 g/m².

7. The process according to claim 1, further comprising winding said web of coated paper, on a reel, and then unwinding the web off said reel and subjecting it to said milling operation.

8. A process for producing flaked insulating material using a paper-production line, comprising,
    supplying a mixture containing a first substance having a flame-retardant function and a second substance having an anti-mould function to a size-press or film-press station; and
    producing, via said line, a web of paper having a given grammage and thickness, and via said size-press or film-press station applying on said web a coating constituted by said mixture.

9. The process of claim 8, wherein said mixture further comprises a third substance having an anti-dusting function.

* * * * *